Dec. 11, 1928.

W. SANGSTER 1,694,452

MILK PASTEURIZER

Filed Feb. 7, 1927 2 Sheets-Sheet 1

WITNESS:

INVENTOR

William Sangster
BY
Busser and Harding
ATTORNEYS.

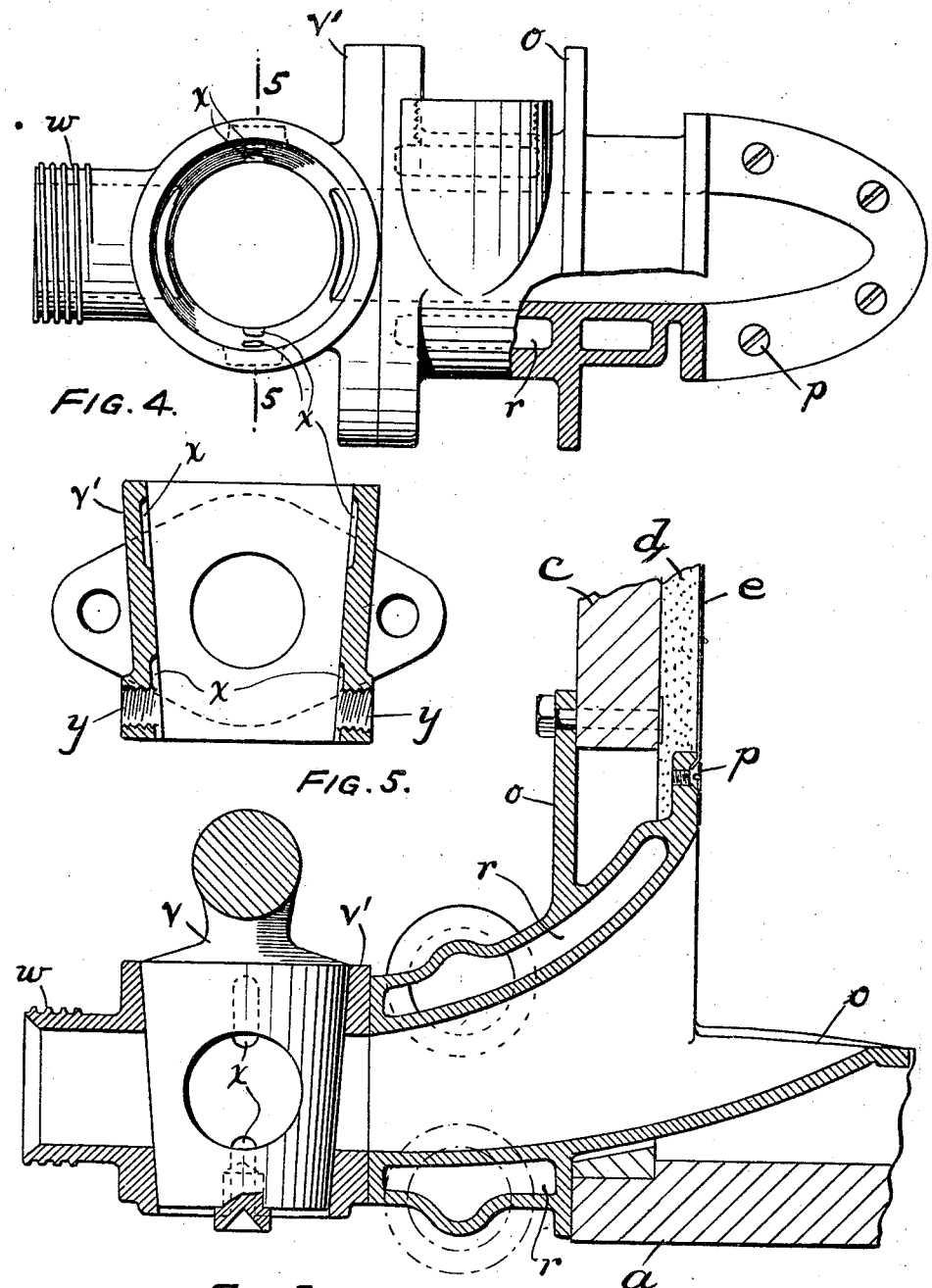

Patented Dec. 11, 1928.

1,694,452

UNITED STATES PATENT OFFICE.

WILLIAM SANGSTER, OF PETERBOROUGH, ONTARIO, CANADA, ASSIGNOR TO THE DE LAVAL SEPARATOR COMPANY, OF NEW YORK, N. Y., A CORPORATION OF NEW JERSEY.

MILK PASTEURIZER.

Application filed February 7, 1927. Serial No. 166,323.

In the pasteurizing of milk it is customary to raise the milk to within a certain temperature range and hold it there for a longer or shorter time dependent on the temperature. Care must be taken, however, to subject the entire body of milk to the predetermined temperature for the requisite time, because if any small proportion of the milk should not be thoroughly pasteurized and should retain harmful bacteria, the whole body of the milk would be subsequently re-contaminated. Hence, in designing pasteurizers, provision has been made to as far as possible subject the entire body of milk uniformly to the necessary thermal conditions by providing a large heating surface concurrently with such agitation of the milk as will bring constantly changing portions of the milk into heat exchange relation therewith.

A well known type of pasteurizer comprises a horizontally extending vessel with thick walls of insulating material, within which rotates an Archimedean screw through which, by the rotation of the screw, the hot brine, hot water or other fluid heating medium is forced. This provides a large heating surface that is constantly in motion and keeps the body of milk in a state of constant turbulence.

It is necessary to provide a draw-off for the milk, which is usually a pipe, or other casting affording an outlet channel, positioned at the bottom of one end of the chamber and provided, necessarily, with a valve which, during the treatment of the milk, is closed, and which, when the operation is concluded, is opened to allow the milk to flow out. This valve cannot be conveniently located in any other position than outside the wall of the chamber. Consequently there is afforded, within this channel, between the interior of the chamber and the valve, a pocket within which settles a small amount of milk, which remains therein substantially quiescent during the heat treatment and is not subjected to the heat except, inadequately, by conduction.

Such imperfect pasteurizers have been in use for some time, with no appreciation, until recently, of their serious defective character. When the defect came to be recognized, the manufacturers resorted to the rather obvious expedient of shifting the position of the valve so as to bring its inner face flush with the inner wall of the chamber, thereby eliminating the "dead" pocket.

This arrangement overcame the defect above mentioned, but gave rise to manufacturing and operating difficulties. Necessarily a special type of valve had to be designed, and means had to be provided for manually operating the valve from outside the chamber, and different valve-operating means were provided that extended, necessarily, either through the interior of the chamber or through the interior of the outlet channel. All such so-called "flush-valve" constructions are extremely expensive and give rise also to difficulties in cleaning. A material addition to the cost of the pasteurizer is in itself a serious objection, in that it encourages the continued use of the older and defective pasteurizer.

The object of my invention is to provide a construction whereby, without the use of a special and expensive valve structure and without substantial additional expense, the described type of pasteurizer may be modified to insure that every particle of the milk will be subjected to the necessary heat conditions. In my invention, the original outlet channel, with a simple valve arranged therein outside the chamber wall, is retained but means are provided whereby the milk therein is subjected to the same heat treatment as that to which the milk in the chamber proper is subjected. Means are also provided whereby the milk within this outlet channel is maintained in circulation in order to avoid a "dead" pocket. Means are also provided whereby the temperature within the pocket may be accurately regulated. Means are also provided whereby, in case of valve leakage, the escaping milk will not flow into the circuit or receptacle provided for receiving the milk after it is pasteurized. Not all of these features are necessary to achieve the main purpose sought, but they all make for the perfection of the pasteurizer. The improved construction involves no more than a nominal increased cost and may be sold at a price competitive with the old and defective apparatus.

In the drawings:

Fig. 3 is an enlarged detail view showing the improved valved outlet from the pasteurizing chamber.

Fig. 4 is a plan view, partly broken away, of the structure of Fig. 3.

Fig. 5 is a section on line 5—5 of Fig. 4.

Figure 2:
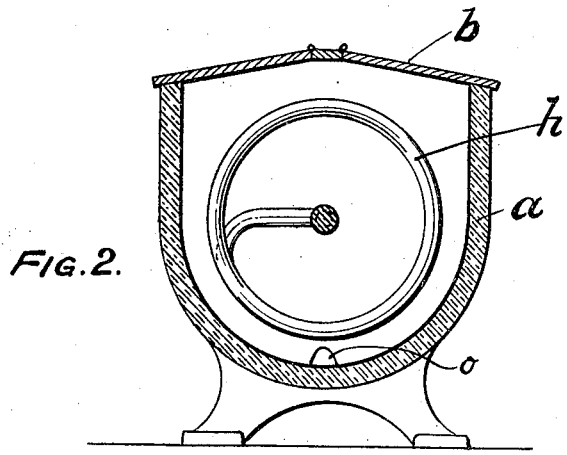
Fig. 2 is a vertical section through the same.
Figure 1:
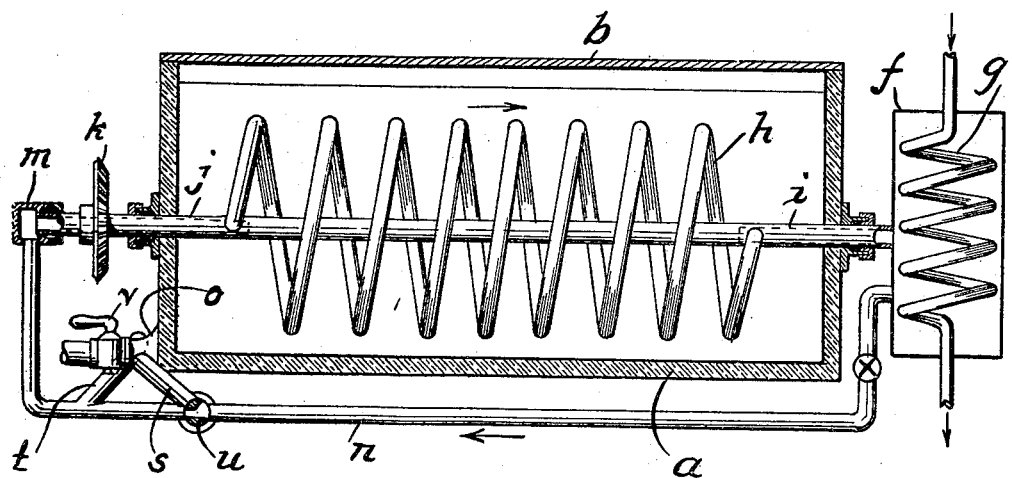
Fig. 1 is a sectional elevation of a complete pasteurizer.

The general construction of the pasteurizer will be only briefly described, since it involves nothing of novelty and is well known in the art.

The pasteurizing vessel $a$ is a horizontally extending receptacle having a semi-cylindrical bottom and vertical side walls, and is provided with a top closure $b$. The wall of the vessel should be of non-heat-conducting material, and preferably comprises, as shown in Fig. 3, a thick exterior wooden wall $c$, an inner lining $d$ of metal such as copper, zinc or tin or an alloy of one or more of such metals, and an intermediate layer $e$ of felt or some appropriate substitute material.

Outside the vessel $a$, near one end thereof, is a heater comprising a receptacle $f$ for brine, water or other liquid or fluid for heating the milk, and a coil $g$ through which steam or other heating fluid is passed for the purpose of heating the fluid that is intended to directly heat the milk.

Extending through the axis of vessel $a$ is a shaft the ends $i$ and $j$ of which are hollow and extend through stuffing boxes on the ends of the vessel. Within the vessel $a$ is a coil $h$ formed of a continuous tube or pipe, the ends of which communicate with the tubular shaft extensions $i$ and $j$, one of which communicates with the interior of the heater $f$ and the other of which extends to a hollow bearing $m$, which is connected with the interior of the heater $f$ by means of a pipe $n$ extending under the vessel $a$.

The tubular extension $j$ is provided with a bevel gear $k$ which (driven by another gear and a driving shaft, not shown) imparts rotation to the shaft and coil, the latter functioning as a screw to establish a flowing endless circuit of heating fluid from heater $f$ through pipe $n$ and coil $h$ back to heater $f$. In the actual operation of my invention, however, some or all of the heating fluid coursing through pipe $n$ is by-passed, as hereinafter described.

The wall of vessel $a$, at one of its bottom end corners, is cut away to receive a casting $o$ provided with a channel that affords an outlet for the milk after the pasteurizing operation is completed. The inner extremity of the channeled member $o$ is flush with the inner wall of vessel $a$ and may be secured thereto by means of screws $p$. The member $o$ is provided, outside the wall of vessel $a$ and spaced a short distance therefrom, with a valve chamber $v'$ containing a valve $v$ and an outlet nipple $w$. The milk pocket hereinbefore described is formed between this valve chamber and the body of vessel $a$. The valve chamber $v'$ may be made as a separate piece, as shown. The wall of this pocket is made hollow to provide a jacket for the reception of a heating medium—preferably the heating fluid that supplies heat to the milk. The heating jacket $r$ thus formed is connected with two pipes $s$ and $t$, both connected with pipe $n$, and a three-way valve $u$ is provided at the junction of pipes $s$ and $n$, the construction being such that some or all of the heating fluid flowing through pipe $n$ may be diverted into pipe $s$, flow through heating jacket $r$, and pass thereoutof into pipe $n$ and thence, as before described, through the coil $h$.

The part of the milk that is caught within the pocket formed between the valve $v$ and the interior of the vessel $a$ is thus subjected to local heating. It has been found that after the apparatus is operating for a short time, and with the valve $u$ positioned to divert the entire stream of heating fluid through jacket $r$, the temperature of the milk within this pocket will rise above the temperature of the main body of the milk within vessel $a$. In case of any tendency to overheating of this part of the milk, valve $u$ may be turned so that only part of the stream of heating fluid will be by-passed through jacket $r$.

However, this precaution has been found unnecessary, because of the means that I have provided to prevent the milk in the outlet pocket remaining quiescent and to insure a constant circulation of milk from the main milk body into the pocket and back again to the main body. This means involves, simply, making the receiving mouth of the pocket diverge inwardly and particularly so that its upper wall, between the valve chamber and the inner wall of vessel $a$, curves upward toward said inner wall. As the milk in the outlet pocket becomes heated, the more highly heated portion rises and as it rises it flows under the upper wall of the pocket inwardly toward and into the main body of milk, being replaced by cooler milk flowing from the main body outward along the bottom of the pocket. It is preferred, in order to facilitate this movement, to provide a larger area of heating surface along the upper wall of the pocket than along the lower wall, as shown in Fig. 3. All that is necessary, therefore, to insure perfection of operation is to provide a heating jacket adjacent the pocket in member $o$ of sufficient area and volume to heat the milk therein to a temperature not substantially lower than that to which the milk in the main body is heated; any tendency to overheating being prevented by the constant circulation of milk into, within and out of, the pocket. For this reason, also, it is quite feasible to simplify the construction shown by omitting that length of pipe $n$ between the inlet to pipe $s$ and the outlet from pipe $t$ and by omitting the three-way valve $r$; so as to provide only one path for the flow of heating medium, namely, through one part of pipe $n$, pipe $s$, pipe $t$ and the other part of pipe $n$.

The valve $v$ may be an ordinary taper plug valve. It is preferred, however, to slightly modify its construction in order to avoid leakage therethrough to the discharge $w$, through which discharge the treated milk is adapted to be delivered to a separate cooler; or for recirculation through the pasteurizer, wherein it may be cooled by circulation of cold brine through the coils $h$. Such leaking milk, if it so escapes before pasteurization, will subsequently contaminate the whole body of milk. To prevent this, the valve casing is provided with recesses $x$, $x$, which receive any milk that may leak around the valve between it and the valve casing, the milk thence flowing down to, and discharging through, one or more escape openings $y$.

By means of the described construction, which is, of course, subject to modification, it is absolutely insured that the whole body of milk admitted to chamber $a$ will be subjected to the thermal conditions required for pasteurization and that, after the pasteurizing operation, the discharged milk will not contain even a very small proportion of insufficiently heated milk.

Having now fully described my invention, what I claim and desire to protect by Letters Patent is:

1. The combination with a milk pasteurizing vessel long relatively to its height and width and having a bottom sloping from opposite sides toward its longitudinal center and at one end a discharge opening communicating with the lowest level of said bottom, of a pipe coil in said vessel, a member having a laterally disposed channel communicating with said opening and through which the milk is adapted to outflow, a valve positioned outside the vessel and controlling the discharge through the channel, means providing a jacket for said channel between the valve and the interior of the vessel, a heater, pipe connections between the heater and opposite ends of the coil to provide an endless path for circulation of a heating medium, and means providing a by-pass around one of said pipe connections through said jacket.

2. The combination with a milk pasteurizing vessel long relatively to its height and width and having a bottom sloping from opposite sides toward its longitudinal center and at one end a discharge opening communicating with the lowest level of said bottom, of a pipe coil in said vessel, a member having a laterally disposed channel communicating with said opening and through which the milk is adapted to outflow, a valve positioned outside the vessel and controlling the discharge through the channel, means providing a jacket for said channel between the valve and the interior of the vessel, a heater, pipe connections between heater and opposite ends of the coil to provide an endless path for circulation of a heating medium, means providing a by-pass around one of said pipe connections through said jacket, and a valve controlling the flow of heating medium from the last named pipe connection through said by-pass.

3. The combination with a milk pasteurizing vessel, of means providing a pocket comprising a laterally disposed channel communicating with an opening in the wall of the vessel and affording an outlet for milk, a valve controlling the flow of milk therethrough, and means to locally heat milk within said pocket between the valve and the interior of the vessel, the inner upper wall of the pocket sloping upward toward the interior, and terminating above the level of the bottom of the vessel to facilitate flow of locally heated milk into the interior of the vessel and thus establish a circulation of milk into, within and from the pocket.

4. The combination with a milk pasteurizing vessel; of means providing a milk pocket through which milk is adapted to outflow from the vessel, means to locally heat milk within said pocket, a valve casing beyond the pocket and a normal milk discharge beyond the valve casing; a valve in the valve casing, and means to intercept milk leaking from the pocket around the valve and to divert the same away from the said normal milk discharge.

5. The combination with a milk pasteurizing vessel, of means providing a milk outlet passage and a tapered valve casing controlling the flow of milk therethrough, means to locally heat milk within said passage, a plug valve provided with a through orifice and turnable within the casing to bring said orifice into and out of register with the milk outlet passage, there being recesses between opposing faces of valve and valve casing which are adapted to intercept milk that may leak between said faces when the valve is closed and which prevent the milk flowing completely around the valve to the normal milk discharge, there being a special escape orifice communicating with said recesses for conveying away such leaking milk.

In testimony of which invention, I have hereunto set my hand, at Toronto, Canada, on this 29th day of January, 1927.

WILLIAM SANGSTER.